Figure 1:
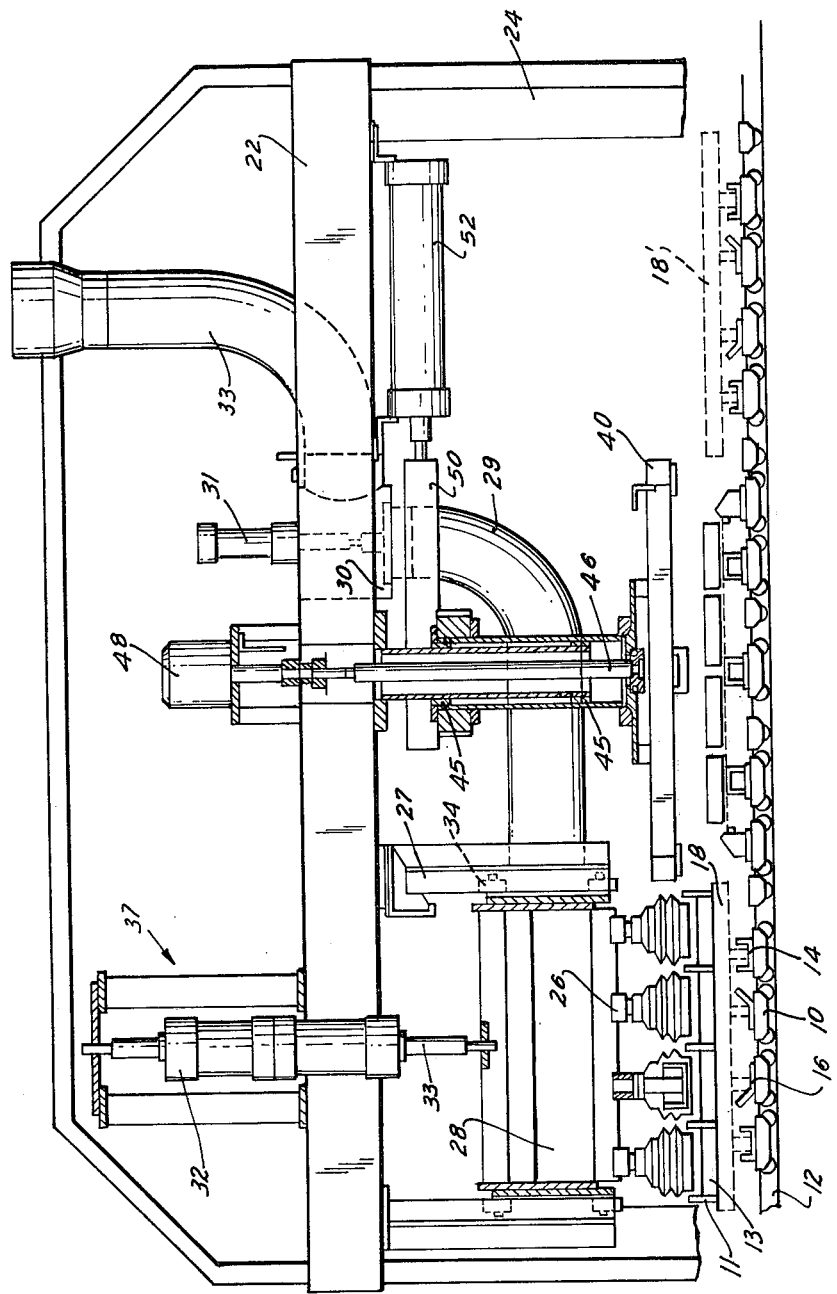

United States Patent [19]

Boucher

[11] 4,318,684
[45] Mar. 9, 1982

[54] METHOD AND INSTALLATION FOR STRIPPING A PIECE OF SOFT CHEESE FROM A MOLD

[75] Inventor: Michel Boucher, Surgeres, France
[73] Assignee: Cartier S.A., Surgeres, France
[21] Appl. No.: 229,457
[22] Filed: Jan. 29, 1981

[30] Foreign Application Priority Data

Feb. 4, 1980 [FR] France ............................... 80 02341

[51] Int. Cl.³ ........................ B29C 7/00; A10J 25/08
[52] U.S. Cl. .................................... 425/437; 425/454
[58] Field of Search .................. 264/334; 485/84, 85, 485/436 R, 437, 444, 86, 176, 556, 388, 404, 424, 438, 454, 350, 453; 414/752

[56] References Cited

U.S. PATENT DOCUMENTS

| | | | |
|---|---|---|---|
| 636,839 | 11/1899 | Pecht ................................... | 425/556 |
| 2,902,804 | 9/1959 | Meulemans et al. ................. | 425/437 |
| 3,363,779 | 1/1968 | Matsushima ......................... | 414/752 |
| 3,974,919 | 8/1976 | Bokalders et al. .................. | 414/752 |

FOREIGN PATENT DOCUMENTS

1421060 11/1965 France .

Primary Examiner—Willard E. Hoag
Attorney, Agent, or Firm—Kurt Kelman

[57] ABSTRACT

In the method and installation of this invention a piece of soft cheese formed in a mold constituted by a vertical cylinder open at both ends and resting on a plate with one of the open ends is removed from the mold cylinder by simultaneously lifting the mold cylinder and the piece of cheese to displace them away from the plate. The piece of cheese is displaced by a suction cup mounted above the other open end of the mold cylinder and the mold cylinder is displaced by a vertically movable clamp holding the mold cylinder tightly. The plate is then substituted by a support for the piece of cheese and the suction cup is vertically displaced relative to the clamp so as to extract the piece of cheese through the open mold cylinder end and to place it on the support.

9 Claims, 3 Drawing Figures

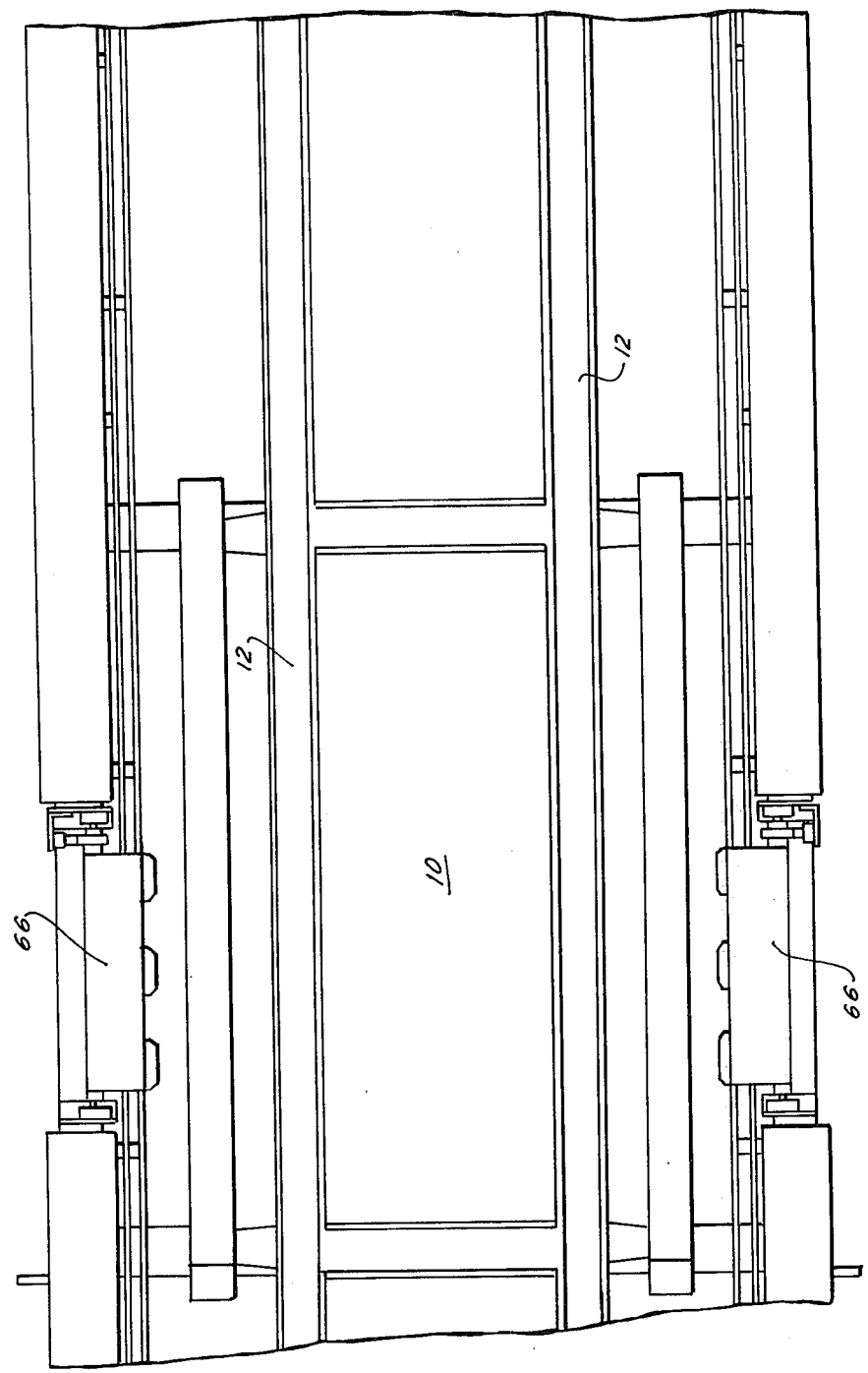

METHOD AND INSTALLATION FOR STRIPPING A PIECE OF SOFT CHEESE FROM A MOLD

The present invention relates to a method of, and an installation for, removing a piece of soft cheese formed in a mold constituted by a vertical cylinder open at both ends and resting on a plate with one of the open ends.

Cheese of a soft pasty consistency is produced in groups of such mold cylinders resting on the plate, with suitable means being interposed between the molded cheese and the plate to permit fluid contained in the cheese to drip off. After the fluid has dripped off and the cheese has the desired consistency, the resultant pieces of cheese are extracted from the molds to subject them to further treatment.

It has been proposed in French Pat. No. 1,421,060 to extract the pieces of soft cheese from their mold cylinders mechanically by mounting a suction cup connectable to a source of vacuum above the other open end of each mold cylinder for holding the piece of cheese and then withdrawing the held piece of cheese through the other open end of the mold cylinder while holding the mold clamped in place. During this extraction, the soft cheese rubs against the mold wall which is relatively high and the resultant friction forces tend to oppose the force to extraction exerted by the suction cup, which may cause the piece of cheese to be deformed. This risk is further increased if, as is often the case, the wall of the mold cylinder is encrusted with dry grains of curd which may tear the skin of the molded piece of cheese. Furthermore, soft cheeses often have a "cap" constituted by curd penetrating between the base of the mold cylinder and the means permitting fluid to drip off, and this "cap" also may be torn off during the removal of the piece of cheese from the mold cylinder.

It is the primary object of this invention to avoid these disadvantages in the extraction of soft cheese from its mold cylinder and to remove the cheese through the open bottom of the mold cylinder.

The above and other objects are accomplished according to one aspect of the invention by simultaneously lifting the mold cylinder and the piece of cheese by separate means to displace the mold cylinder and the piece of cheese away from the plate, substituting a support for the plate under the one open end of the mold cylinder, and effectuating a relative movement between the mold cylinder and the piece of cheese so as to extract the piece of cheese from the mold cylinder through the one open end and to dispose the piece of cheese on the subtending support.

According to another aspect of the present invention, an installation for carrying out the above process comprises a group of mold cylinders, a suction cup connectable to a source of vacuum and mounted above the other open end of each mold cylinder for holding the piece of cheese, a clamping means arranged to hold the mold cylinders tightly, first and second means for respectively vertically displacing the suction cups and the clamping means, and control means for synchronously operating the first and second displacing means for first simultaneously lifting the mold cylinders and the pieces of cheese therein and then displacing the pieces of cheese relative to the mold cylinders until the pieces of cheese have been extracted from the mold cylinder through the one open ends.

Figure 2:
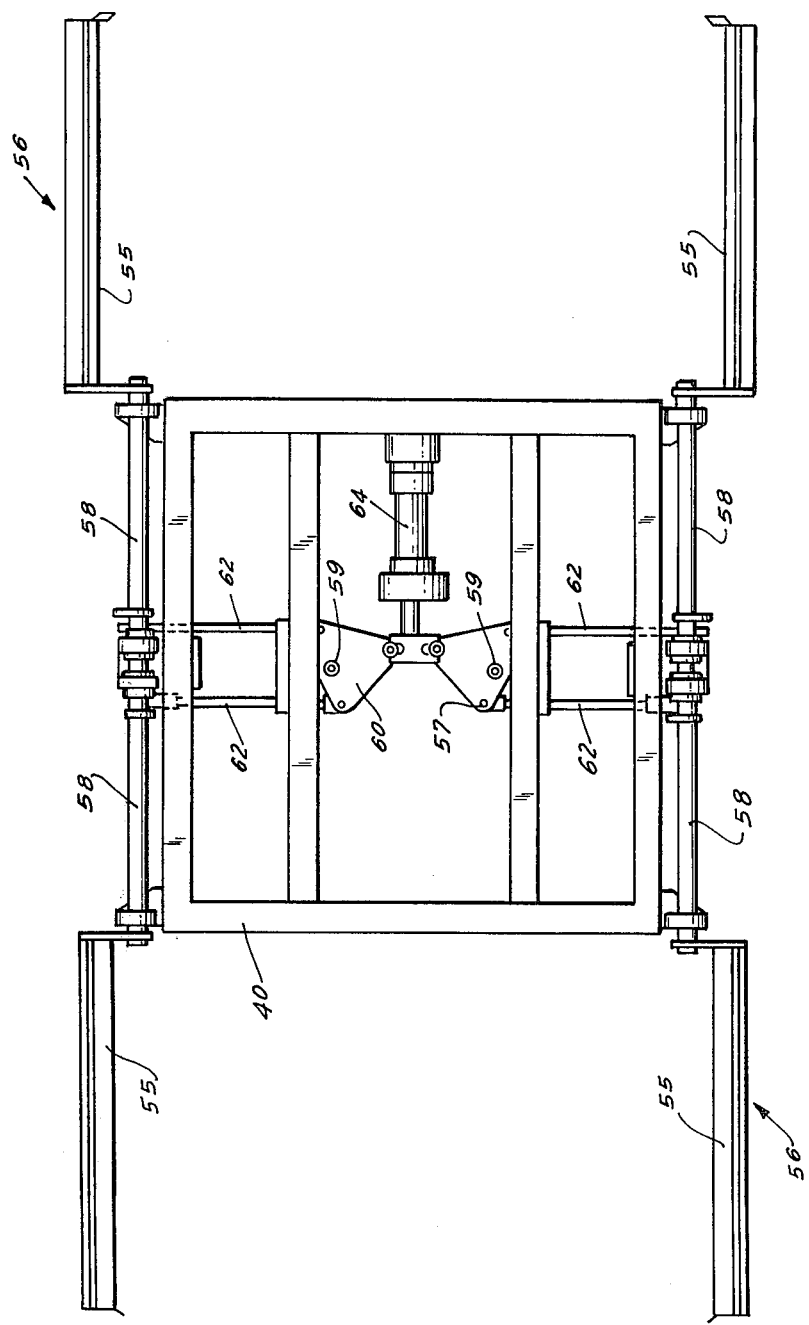

The above and other objects, advantages and features of this invention will become more apparent from the following detailed description of a now preferred embodiment thereof, taken in conjunction with the accompanying schematic drawing wherein FIG. 1 is a side elevational view of an installation according to the invention, certain structural parts being shown in section and others being omitted to depict the major features of the installation more clearly;

FIG. 2 is a plan view of the preferred clamping means for holding the mold cylinders tightly; and FIG. 3 is a plan view of a portion of the conveyor and showing the grips holding the drip pan in place during the removal of the freshly formed piece of soft cheese from the mold cylinder.

Referring now to the drawing, the illustrated installation essentially comprises a horizontally extending endless chain conveyor, a pneumatic device for holding the piece of cheese during and for removal from its mold cylinder, and a clamping mechanism for tightly holding the mold cylinder. The installation is designed for removing a piece 13 of soft cheese, i.e. cheese of generally pasty consistency, formed in mold 11 constituted by a vertical cylinder open at both ends and resting on plate 18 with one of the open ends.

As shown, the installation comprises a group of mold cylinders 11 and a suction cup 26 connectable to a source of vacuum (in a manner to be described hereinafter) and mounted above the other, upper open end of each mold cylinder 11 for holding piece of cheese 13. Clamping means 56 (shown in FIG. 2 but omitted in FIG. 1 so that the mold cylinders may be seen in this side elevation view) is arranged to hold the mold cylinders tightly (in a manner to be described hereinafter). Casing 28 carries suction cups 26, the suction cups being affixed to the underside of the casing and their number corresponding to the number of mold cylinders carried by plate 18. Casing 28 is connected to a source of vacuum 33 through a valve box 30 by flexible tubes 29 and the illustrated means for vertically displacing the group of suction cups 26 includes vertical guide means 27 for casing 28, the guide means consisting of rails guiding rollers 34 which vertically displaceably mount casing 28 on the guide rails, and jack 32 is connected to casing 28 for vertical displacement along guide means 27. Guide rails 27, jack 32 as well as valve box 30 are mounted on support frame 22 of the installation.

This support frame also carries the means for vertically displacing clamping means 56. As shown in FIG. 2, the preferred clamping means illustrated herein comprises carrier frame 40 pivotal about a vertical axis and a pair of clamping means 56 mounted on the carrier frame and so arranged thereon that pivoting the carrier frame about the vertical axis thereof will so displace the pair of clamping means 56 horizontally that one of the clamping means 56 will take the place of the other clamping means, i.e. swinging carrier frame 40 about its vertical axis will bring the group of mold cylinders 11 from its position in alignment with plate 18 (shown in FIG. 1) to a position in alignment with a successive plate 18'.

First tube 44 is affixed to support frame 22 and second tube 42 is glidably and rotatable mounted on first tube 44. Carrier frame 40 for clamping means 56 is affixed to one end of second tube 42 and tubes 42, 44 define the vertical axis about which the carrier frame is pivoted for the horizontal displacement of the clamping means. The means for vertically displacing the clamping means includes jack 48 affixed to support frame 22 and having piston rod 46 extending through tubes 42, 44 and connected to carrier frame 40.

Jacks 32 and 48, upon synchronous and subsequently sequential operation, constitute control means for simultaneously lifting the group of mold cylinders held tightly by clamping means 56 and pieces of cheese 13 held by suction cups 26 away from plate 18 and then displacing the pieces of cheese relative to the mold cylinders until the pieces of cheese have been extracted from the mold cylinders through the one open end.

As shown in FIG. 1, the installation comprises a conveyor mounted below the one open end of mold cylinders 11, the illustrated conveyor being constituted by a series of small carriages 10 rolling along two parallel rails 12 and connected to two endless conveyor chains enabling the conveyor to advance step-by-step. Small conveyor carriages 10 are equipped with support and centering elements 14, 16 for holding a respective plate 18 in subtending relationship to the group of mold cylinders 11 and for supporting the cheese in the mold cylinders while the pieces of cheese are formed therein. As illustrated in FIG. 1, respective plates 18, 18' and supports 20, such as grids, for pieces of cheese 13 are arranged on the conveyor in alternating succession for respectively subtending the on open mold cylinder ends and the pieces of cheese. The conveyor is controlled by conventional means (not shown) in response to the operation of vertical displacement control means 32, 48 to advance the conveyor a step after the mold cylinders and pieces of cheese have been simultaneously lifted so as to move subtending plate 18 from the one open mold cylinder ends and to place a respective support 20 into subtending relationship to the extracted piece of cheese, and then further to advance the conveyor another step to move supports 20 with the extracted pieces of cheese thereon away and to place plate 18' into subtending relation to the open mold cylinder ends. Plates 18 and supports 20 are suitably positioned and spaced in correlation with the step-by-step advancement of the conveyor to assure accurate alignment with the mold cylinders and the pieces of cheese formed therein and extracted therefrom after they have been molded.

The support frame 22 is comprised of horizontal beams supported by four pillars 24 above the conveyor.

In the illustrated embodiment, the group of mold cylinders 11 is assembled into an integral unit and may consist of a single synthetic resin structure defining a desired number of bores to constitute the open mold cylinders. Suction cups 26 are dimensioned to enable them to enter each mold cylinder when their carrier casing 28 has been lowered into the desired position for enabling the suctions cups to grip and hold the molded pieces of cheese. Illustrated jack 32 is a double-acting jack having a lower piston rod 33 connected to casing 28 and an upper piston rod 35 connected to support structure 37 mounted on support frame 32. The jack is operable to displace casing 28 and suction cups 26 carried thereby into three vertical positions: an upper level when the two pistons are adjacent each other in the center of the jack cylinder, a lower level when the two pistons are at respective ends of the jack cylinder, and an intermediate level when one of the pistons is at the center and the piston is at an opposite end of the cylinder.

As has been indicated hereinabove, clamping means 56 are horizontally displaceable, tube 42 carrying carrier frame 40 of the clamping means being rotatable about tube 44 and this rotation being facilitated by the interposition of anti-friction bearings 45, 45 between tubes 42 and 44. Control means is provided for horizontally displacing clamping means 56 in response to the operation of control jack 48 to displace the clamping means when the clamping means has been vertically displaced upwardly by jack 48, clamping means 56 being displaced horizontally to bring mold cylinders 11 into vertical alignment with successive plate 18'. The illustrated horizontal displacement control means causes the pair of clamping means 56, 56 to be so displaced that one clamping means will take the place of the other clamping means, the replacement of one of the clamping means by the other clamping means corresponding to two steps of advancement of the conveyor whereby one of the clamping means will cause the empty mold cylinders to be placed on successive plate 18' while the other clamping means will hold mold cylinders 11 wherein the pieces of cheese 13 are formed on alternating plate 18. This control means is shown to include horizontal rack 50 actuated by jack 52 mounted on support frame 22 and meshing with annular gear 54 keyed to rotatable tube 42. The height of the meshing teeth of rack 50 and gear 54 is such that the rack and gear remain engaged when carrier frame 40 of the clamping means is vertically displayed by jack 48 between two end positions. Actuation of jack 52 will rotate tube 42 and turn carrier frame 40 by 180° for the described horizontal displacement of clamping means 56.

The preferred clamping mechanism is shown in FIG. 2. As shown, a pair of clamping means 56 is mounted symmetrically in relation to a central vertical axis of rotation on rectangular carrier frame 40, this frame being rotatable through 180° about this axis defined by vertical tubes 42, 44. The distance between the clamping means corresponds to that of successive plates 18, 18' on the conveyor so that rotation of the carrier frame by 180° will displace a group of mold cylinders held tightly by one clamping means from one of the plates on the conveyor to the next plate. As illustrated, the preferred clamping means each comprises two gripping claws 55, 55 movable between an open position and a closed position. Each gripping claw is keyed to crank shaft 58 and the four shafts of clamping means 56, 56 are parallel to each other. One of the gripping claws and its shaft of one clamping means 56 is aligned with one of the gripping claws and its shaft of the other clamping means, the shafts being journaled for rotation on carrier frame 40. Additional control means is provided for simultaneously operating gripping claws 55 of clamping means 56, 56 so that the gripping claws of one clamping means are moved into the open position when the gripping claws of the other clamping means are moved into the closed position. The illustrated additional control means includes single jack 64 and a system of levers 60 and connecting rods 62 connecting jack 64 to shafts 58. Jack 64 is mounted on carrier frame 40 and cranking rods 62 connect the shafts to levers 60 mounted on carrier frame 40 for pivoting about vertical axes 59. Connecting rods 62 are pivoted to their levers 60 at pivot points 57, 57 at respective sides of vertical axes 59 and at equal distances therefrom so that pivoting of each lever 60 by jack 64 causes a rotation of shafts 58 controlled by the respective lever in opposite directions. In this manner, the gripping claws of one clamping means are closed to hold a group of mold cylinders tightly on plate 18 under suction cups 26 while the gripping claws of the other clamping means in vertical alignment with plate 18' are opened two steps downstream.

Generally, a wooden or synthetic resin device is interposed between the one open end of mold cylinders 11 and plate 18 to facilitate excess fluid from the pieces of soft cheese formed in the mold cylinders to drip off and thus to solidify the pieces of cheese. Thus, the cheese actually rests on this device rather than on plate 18. Accordingly, pivotal grippers 66 (see FIG. 3) suitably operated by jacks are mounted along the conveyor at both sides of plate 18 to engage the sides of the plate and of the dripping device to hold them in position at the operating station and to prevent them from being lifted together with the mold cylinders.

With an installation of the above-described type, the mold cylinder and the piece of cheese therein will be lifted simultaneously by separate means to displace the mold cylinder and the piece of cheese away from plate 18, a support 20 will be substituted for the plate under the one open end of the mold cylinder, and a relative movement will then be effectuated between mold cylinder 11 and piece of cheese 13 so as to extract the piece of cheese from the mold cylinder through the one open end and to dispose the extracted piece of cheese on the subtending support.

Referring to the embodiment described and illustrated herein, this operation will proceed in the following manner, assuming that plate 18 has just been brought by the conveyor to the illustrated station under suction cups 26 where the pieces of cheese formed in mold cylinders 11 are to be removed therefrom. The conveyor is halted and control jacks 32 and 64 are actuated to lower casing 28 and thereby to move suction cups 26 into mold cylinders 11 while simultaneously closing gripping claws 55 of one of clamping means 56 to hold the group of mold cylinders into which the suction cups have been lowered, as indicated on the left in FIG. 1. At this stage, carrier frame 40 is in the lowered position shown in FIG. 1. As soon as suction cups 26 contact pieces of cheese 13 in the mold cylinders, valve box 30, which had been in communication with the atmosphere, is displaced by jack 31 to connect tube 29 to source of vacuum 33 whereby suction is applied to the suction cups and the suction cups hold the pieces of cheese.

At this point, control jacks 32 and 48 are actuated to lift suction cups 26 and clamping means carrier frame 40 simultaneously and at the same speed, which causes mold cylinders 11 and pieces of cheese 13 to be displaced upwardly away from plate 18, the pieces of cheese being held by suction cups 26 and the mold cylinders being held by clamping means 56. At this stage, the conveyor is advanced one step (to the left in FIG. 1) so as to move subtending plate 18 from the one open mold cylinder ends and to place respective support grid 20 into subtending relationship to piece of cheese 13. Control jack 32 is now actuated again to lower the suction cups and pieces of cheese held thereby while the mold cylinders are held in position, i.e. a relative movement is effectuated between the mold cylinders and the pieces of cheese so as to extract the pieces of cheese from the mold cylinders and to dispose the pieces of cheese on supports 20. Jack 31 is then actuated to move valve box 30 to connect suction cup casing 28 to the atmosphere again whereby the suction cups release the extracted pieces of cheese and control jack 32 is actuated to lift the suction cups above the mold cylinders which are still held in their upper position. The conveyor is then advanced another step to move the supports with the extracted pieces of cheese thereon away and to place another plate 18 carrying a group of mold cylinders with pieces of cheese therein into the operating station, control jack 52 being actuated to turn clamping means carrier frame 40 by 180° so as to move the group of emptied mold cylinders from the operating station into registry with a successive plate 18'. After carrier frame 40 has been turned, control jack 48 is actuated to lower the group of empty mold cylinders into plate 18'.

The installation is now in position to commence the next operating cycle, jack 64 being actuated for simultaneously closing the gripping claws of the left-hand clamping means to hold the mold cylinders tightly at the operating station while opening the gripping claws of the right-hand clamping means to release the empty mold cylinders in registry with plate 18'. The support grids carrying the pieces of cheese and the plate carrying the empty molds are then manually or mechanically discharged from the conveyor.

The operation of the jacks is controlled by solenoid valves whose energization is so programmed that the above-described sequence of operations will be effected in synchronization with the step-by-step advance of the conveyor, such programmed operation being entirely conventional.

What is claimed is:

1. An installation for removing a piece of soft cheese formed in a mold constituted by a vertical cylinder open at both ends and resting on a plate with one of the open ends, which comprises
   (a) a group of said mold cylinders,
   (b) a suction cup connectable to a source of vacuum and mounted above the other open end of each mold cylinder for holding the piece of cheese,
   (c) a clamping means arranged to hold the mold cylinders tightly,
   (d) a first means for vertically displacing the suction cups,
   (e) a second means for vertically displacing the clamping means, and
   (f) control means for synchronously operating the first and second displacing means for first simultaneously lifting the mold cylinders and the pieces of cheese therein and then displacing the pieces of cheese relative to the mold cylinders until the pieces of cheese have been extracted from the mold cylinders through the one open ends.

2. The installation of claim 1, further comprising a casing carrying the suction cups, a valve box connected to the vacuum source and a flexible tube connecting the valve box to the casing, and the first means for vertically displacing the suction cups including vertical guide means for the casing, rollers vertically displaceably mounting the casing on the guide means, and a jack connected to the casing for vertical displacement thereof along the guide means.

3. The installation of claim 4, further comprising a gripping means arranged at each side of the conveyor for clamping in position the plate while the mold cylinders and pieces of cheese therein are lifted.

4. The installation of claim 1, further comprising a conveyor mounted below the one open end of the mold cylinders and arranged for advancing step-by-step, respective ones of the plates and supports for the pieces of cheese therein arranged on the conveyor in alternating succession for respectively subtending the one open mold cylinder ends and the pieces of cheese, and the conveyor being controlled in response to the control means to advance the conveyor a step after the mold cylinders and pieces of cheese have been simultaneously lifted so as to move subtending plate from the one open mold cylinder ends and to place a respective support into subtending relationship to the piece of cheese, and then to advance the conveyor another step to move the support with the extracted piece of cheese thereon away and to place a respective plate into subtending relation to the one open mold cylinder end.

5. The installation of claim 4, wherein the clamping means is horizontally displaceable and further comprising second control means for horizontally displacing the clamping means in response to the first-named control means to displace the clamping means horizontally when the clamping means has been vertically displaced upwardly, the clamping means being displaced horizontally to bring the mold cylinders into vertical alignment with a successive one of the plates.

6. The installation of claim 5, further comprising a carrier frame pivotal about a vertical axis, a pair of said clamping means mounted on the carrier frame and so arranged thereon that pivoting the carrier frame about the vertical axis thereof will so displace the pair of clamping means horizontally that one of the clamping means will take the place of the other clamping means, the replacement of one of the clamping means by the other clamping means corresponding to two steps of advancement of the conveyor whereby one of the clamping means will cause the empty mold cylinders to be placed on the successive plate while the other clamping means will hold the mold cylinders wherein the pieces of cheese are formed on an alternating one of the plates.

7. The installation of claim 6, further comprising a support frame for the installation, a first tube affixed to the support frame, a second tube glidably and rotatably mounted on the first tube, the carrier frame being affixed to one end of the second tube and the tubes defining the vertical axis, the second means for vertically displacing the clamping means including a first jack affixed to the support frame and having a piston rod extending through the tubes and connected to the carrier frame, and means for pivoting the carrier frame including a second jack, an annular gear coaxially keyed to the second tube and a rack meshing with the annular gear, the second jack being arranged to operate the rack for rotating the second tube.

8. The installation of claim 6 or 7, wherein the clamping means each comprises gripping claws movable between an open and closed position, and further comprising additional control means for simultaneously operating the gripping claws of the pair of clamping means so that the gripping claws of one of the clamping means are moved into the open position when the gripping claws of the other clamping means are moved into the closed position.

9. The installation of claim 8, wherein each clamping means has two gripping claws and further comprising a shaft to which each gripping claw is keyed, the four shafts of the clamping means being parallel to each other, and the additional control means includes a single jack and a system of levers and connecting rods connecting the jack to the shafts, the levers and connecting rods being operated by the single jack for rotating the shafts and thereby to move the gripping claws into the open and closed positions.

* * * * *